F. A. Roberts,
Horse Tail Holder.
No. 10,043.   Patented Mar. 22, 1870.

United States Patent Office.

FRANCIS A. ROBERTS, OF NORTH VASSALBOROUGH, MAINE.

Letters Patent No. 101,043, dated March 22, 1870.

IMPROVED TAIL-HOLDER FOR HORSES.

The Schedule referred to in these Letters Patent and making part of the same.

*To all whom it may concern:*

Be it known that I, FRANCIS A. ROBERTS, of North Vassalborough, in the county of Kennebec and State of Maine, have invented a new and improved Tail-Holder for Horses and other Animals; and I do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
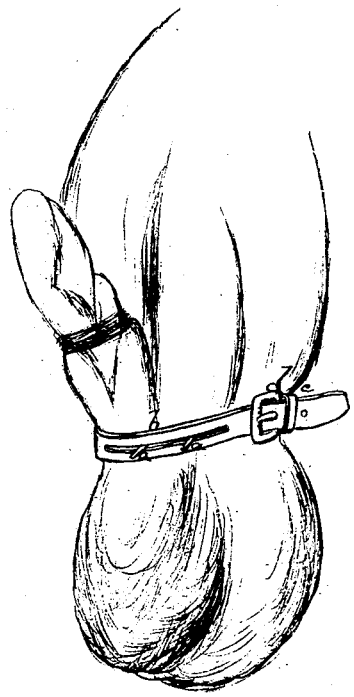
Figure 1 is a perspective view of my invention applied.
Figure 2:
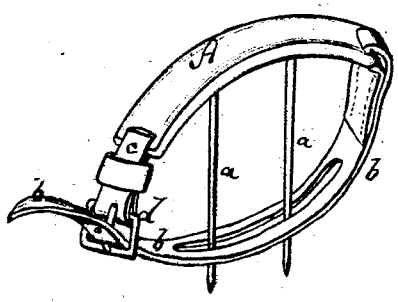
Figure 2 is a detached perspective view of the same.

This invention has for its object to construct a device by means of which the folds of horses' tails can be held together without injuring the hair, and which can be rapidly and conveniently applied.

The invention consists in the use of a partly flexible, partly rigid buckle, which is strapped around the folds of the tail, and which has teeth or prongs projecting through the tail to hold the device in place.

A in the drawing represents a curved metal plate, with prongs *a a* projecting from its concave face.

The ends of the plate A are, respectively, secured to straps *b c*, of which the latter carries a buckle, *d*, as shown.

The device is strapped around a horse's tail in the manner indicated in fig. 1, the strap *b* being secured to the buckle, the prongs piercing the tail, and preferably projecting with their ends through a slot of the strap *b*.

By this means the tail can be gathered up and its folds held together without tedious process.

Having thus described my invention,

I claim as new and desire to secure by Letters Patent—

The tail-holder herein described, consisting of a curved plate, A, provided with the prongs *a* and straps *b c*, substantially as shown and described.

The above specification of my invention signed by me this 28th day of December, 1869.

F. A. ROBERTS.

Witnesses:
ISAAC JENKINS,
M. FRANCIS.